(12) United States Patent
Noguchi et al.

(10) Patent No.: US 7,677,382 B2
(45) Date of Patent: Mar. 16, 2010

(54) METHOD AND APPARATUS FOR ASSEMBLING AND MANUFACTURING

(75) Inventors: Sumio Noguchi, Tochigi (JP); Masakazu Adachi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 246 days.

(21) Appl. No.: 11/817,600

(22) PCT Filed: Mar. 2, 2006

(86) PCT No.: PCT/JP2006/303990

§ 371 (c)(1),
(2), (4) Date: Sep. 17, 2007

(87) PCT Pub. No.: WO2006/093228

PCT Pub. Date: Sep. 8, 2006

(65) Prior Publication Data

US 2008/0302636 A1    Dec. 11, 2008

(30) Foreign Application Priority Data

Mar. 3, 2005    (JP) .............................. 2005-058338

(51) Int. Cl.
*B65G 37/00* (2006.01)

(52) U.S. Cl. .................. 198/346.2; 198/575; 198/343.2

(58) Field of Classification Search ............... 198/343.1, 198/343.2, 346.1, 346.2, 617, 570, 575; 29/33 P, 29/563, 650
See application file for complete search history.

(56) References Cited

U.S. PATENT DOCUMENTS

| 3,860,125 | A | * | 1/1975 | Johnson et al. | .......... 198/346.2 |
| 5,191,958 | A | * | 3/1993 | Tolocko | .................. 198/346.2 |
| 5,539,975 | A | * | 7/1996 | Kukuljan et al. | .............. 29/701 |
| 6,336,546 | B1 | * | 1/2002 | Lorenz | ..................... 198/346.2 |
| 6,591,961 | B2 | * | 7/2003 | Fukushima | .............. 198/346.2 |

* cited by examiner

*Primary Examiner*—James R Bidwell
(74) *Attorney, Agent, or Firm*—Rankin, Hill & Clark LLP (57) ABSTRACT

An assembling apparatus and method easily applicable to an existing production line and capable of improving assembling quality and reducing equipment cost. The assembling apparatus performs processing such as part assembling or the like to a processed part which is free-flow conveyed by a processed part conveyor. The processing is performed by a robot which is conveyed in the same direction as the processed part by a robot conveyor having its own motor. The processed part conveyor is provided with a removable pallet for supporting the processed part. The robot conveyor comprises a turntable which mounts and rotationally positions the robot thereon, a pallet support provided on the turntable so that the removed pallet from the processed part conveyor is supported thereon, and a connector for connecting with the processed part conveyor to synchronously convey the same.

3 Claims, 6 Drawing Sheets

METHOD AND APPARATUS FOR ASSEMBLING AND MANUFACTURING

BACKGROUND OF THE INVENTION

The present invention relates to a method and apparatus for assembling and manufacturing in which processed processing of a conveyed processed part is performed by a processing device which is conveyed in the same direction as the processed part.

Conventionally, there has been known a part assembling method in which a carriage for supporting and conveying an assembled body (vehicle body) is synchronously conveyed together with a movable table on which an assembling robot or the like is mounted. During this synchronous conveying, parts are assembled into the assembled body by the robot or the like in a state where the assembled body is supported on the side of the movable table. Then, the assembled body is returned, when the assembling operation is finished, to the original carriage to be conveyed (for example, see Patent reference 1).

Patent reference 1: Japanese patent application publication No. 61-146690.

In the part assembling method disclosed in Patent reference 1, however, the delivery of the vehicle body is directly performed between the carriage and the movable table, so that the vehicle body can easily be externally scratched. Also, since the synchronization between the carriage and the movable table is performed with pulse signals generated by pulse generators mounted on motors for the carriage and the movable table, rather than by a mechanical connection, it is not possible to continue to convey the carriage and the movable table when the synchronization controller suffers a breakdown. Further, since the conveying method of the carriage is required to be limited to a speed adjustable self-propelled method, it is difficult to apply to the existing production line.

The present invention is made in view of such problems of the conventional art and aims to provide a method of assembling production and an apparatus therefor easily applicable to the existing production line and capable of improving the assembling quality and reducing the equipment cost.

SUMMARY OF THE INVENTION

To solve the above mentioned problems, the present invention according to a first aspect is directed to an assembling method of processing, such as part assembling or the like, to a processed part which is free-flow conveyed by a processed part conveying mean. The part processing is provided by a processing device which is conveyed in the same direction as the processed part using a processing device conveying means, which has its own driving source. The method comprises a conveying means connecting step for connecting the processed part conveying means with the processing device conveying means, a processed part holding step for transferring the processed part from the processed part conveying means to the processing device conveying means while being synchronously conveyed, so as to position and hold the processed part on the processing device conveying means, a processing step in which the processing device processes the processed part while being synchronously conveyed, a processed part returning step for transferring and returning the processed part from the processing device conveying means to the processed part conveying means while being synchronously conveyed, and a conveying means connection releasing step for releasing the connection between the processed part conveying means and the processing device conveying means.

The invention according to a second aspect is directed to an assembling apparatus for processing, such as part assembling or the like, to a processed part which is free-flow conveyed by a processed part conveying means. The processing is performed by a processing device which is conveyed in the same direction as the processed part by a processing device conveying means having its own driving source. The processed part conveying means is provided with a removable pallet supporting the processed part, and the processing device conveying means comprises a turntable having the processing device mounted thereon to rotationally position the processing device, a pallet supporting means provided on the turntable for removing the pallet from the processed part conveying means so as to support the same, and a connector means for connecting with the processed part conveying means so as to synchronously convey the same.

The invention according to a third aspect is directed to an assembling production apparatus of the second aspect, wherein a floating mechanism and a centering mechanism in relation to the conveying direction are provided on the driving source of the processing device conveying means.

In the invention according to the first aspect, the processed part is transferred from the processed part conveying means to the processing device conveying means to be positioned and held thereon, so that the relative positional relationship between the processing device and the processed part is fixed so as to improve accuracy of the assembling and processing by the processing device.

In the invention according to the second aspect, the processing device conveying means has the pallet supporting means for removing the pallet from the processed part conveying means so as to support the same and the connector means connected with the processed part conveying means to synchronously convey the same. This allows the relative positional relationship between the processing device and the processed part to be fixed so as to improve accuracy of the processing by the processing device.

In the invention according to the third aspect, since the floating mechanism and the centering mechanism in relation to the conveying direction are provided on the driving source of the processing device conveying means, the driving source and peripheral parts are prevented from suffering damages even if the load is imposed thereon, when a power supply source is suddenly turned off and inertial conveying force is caused on the processing device conveying means and the processed part conveying means.

DETAILED DESCRIPTION OF THE INVENTION

Figure 3:
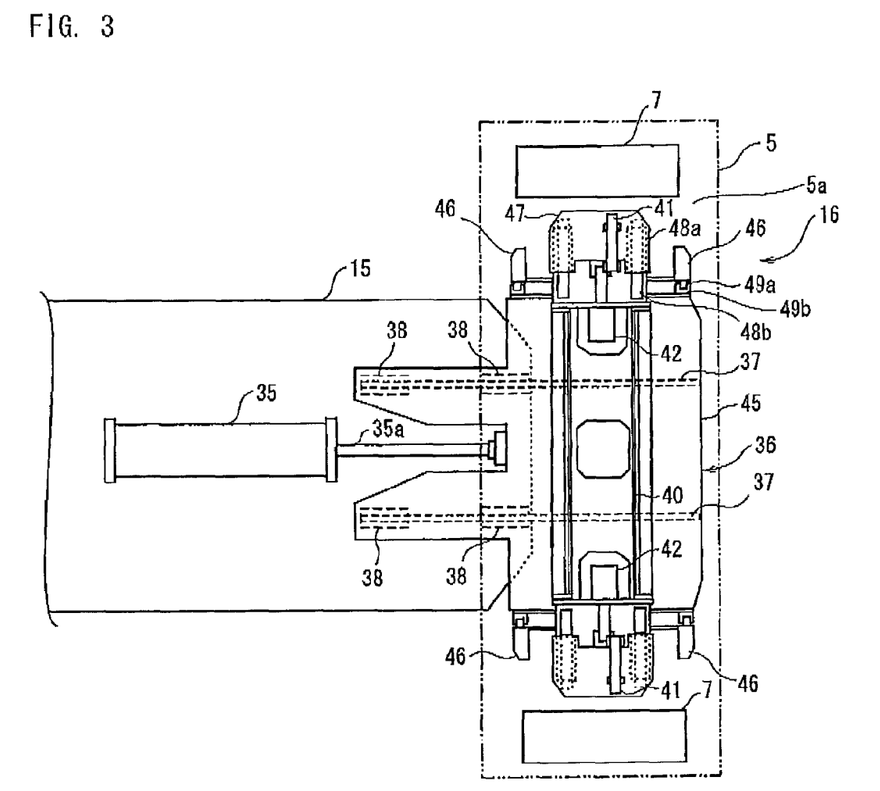
FIG. 3 is a plan view of a pallet support means.
Figure 4:
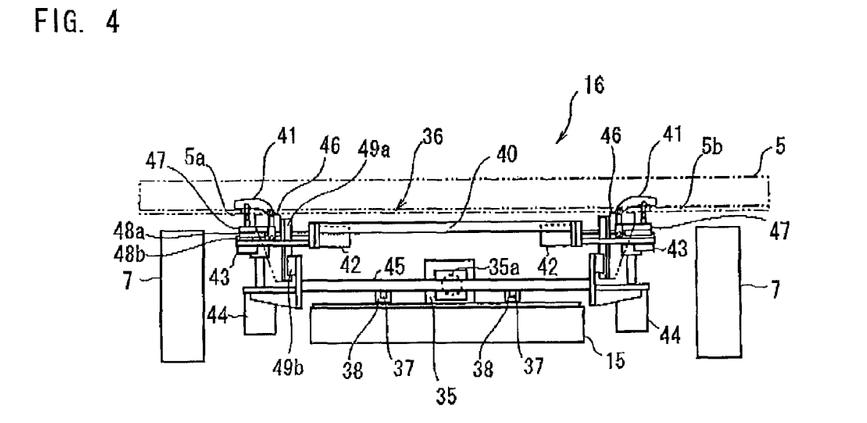
FIG. 4 is a front view of the pallet support means.
Figure 5:
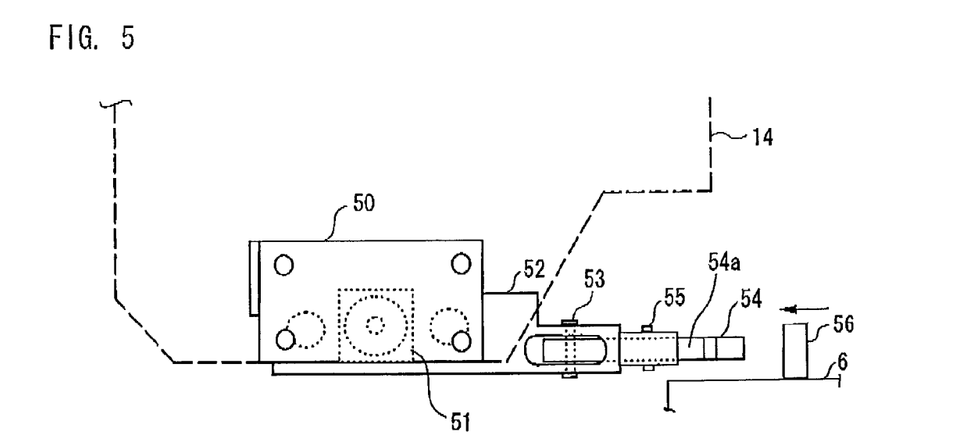
FIG. 5 is a plan view of a connector means.
Figure 6:
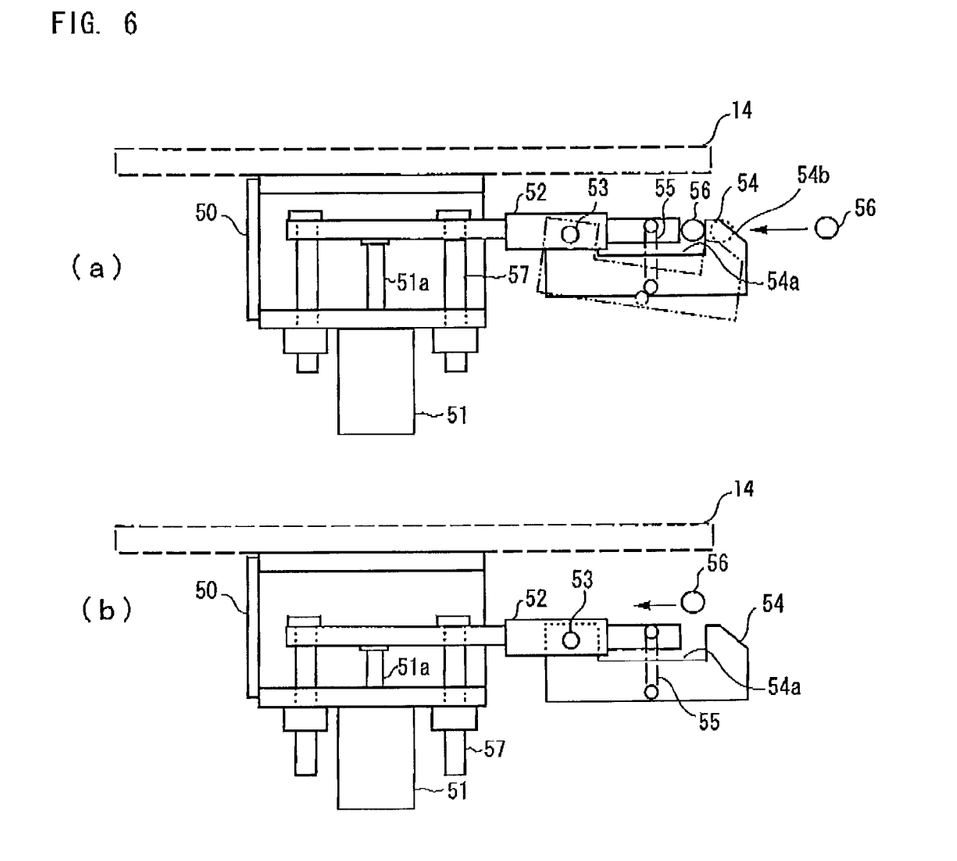
FIG. 6 is a side view of the connector means, wherein (a) shows a connected state and (b) shows a connection released state.
Figure 7:
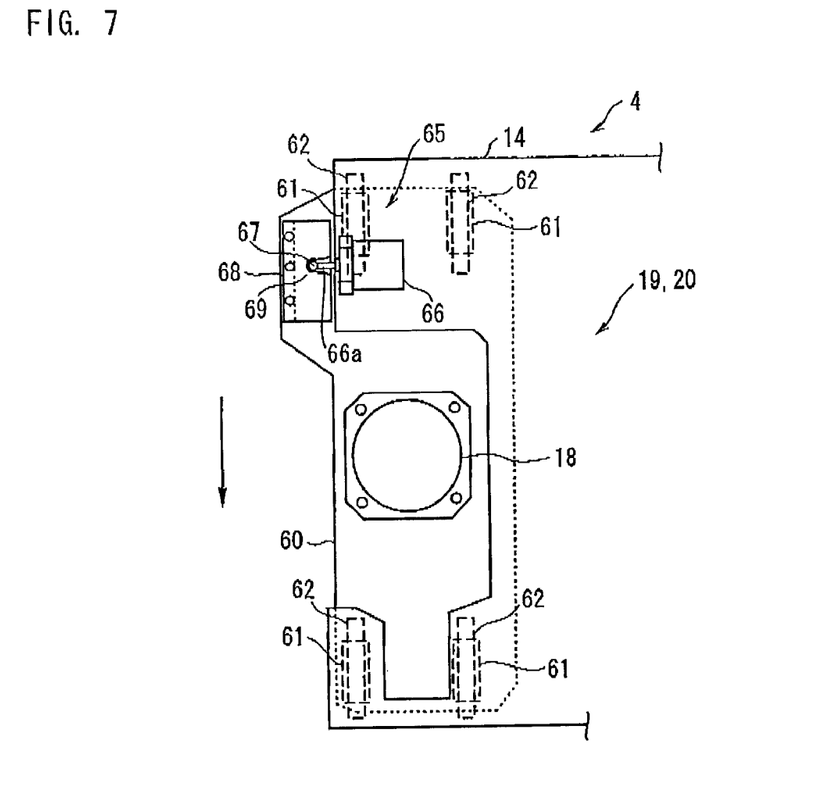
FIG. 7 is a plan view showing a floating mechanism and a centering mechanism of a motor.
Figure 8:
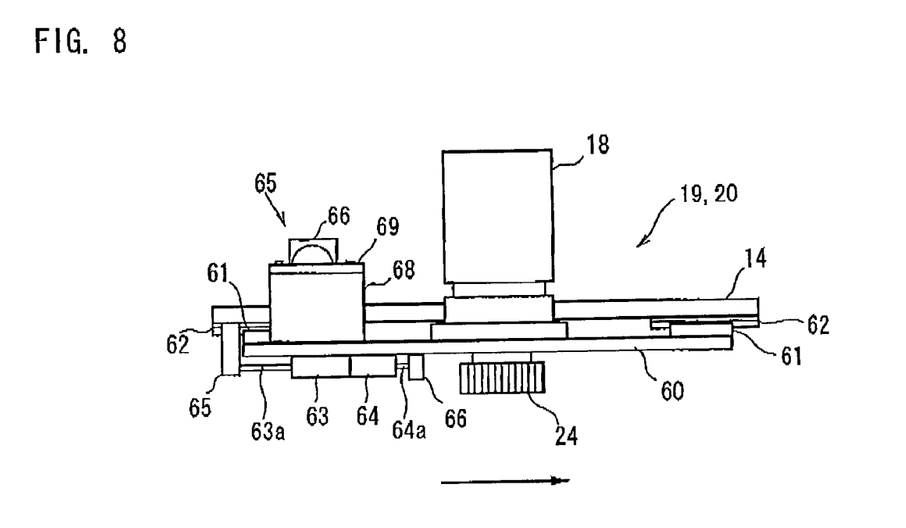
FIG. 8 is a side view showing the floating mechanism and the centering mechanism of the motor.
Figure 9:
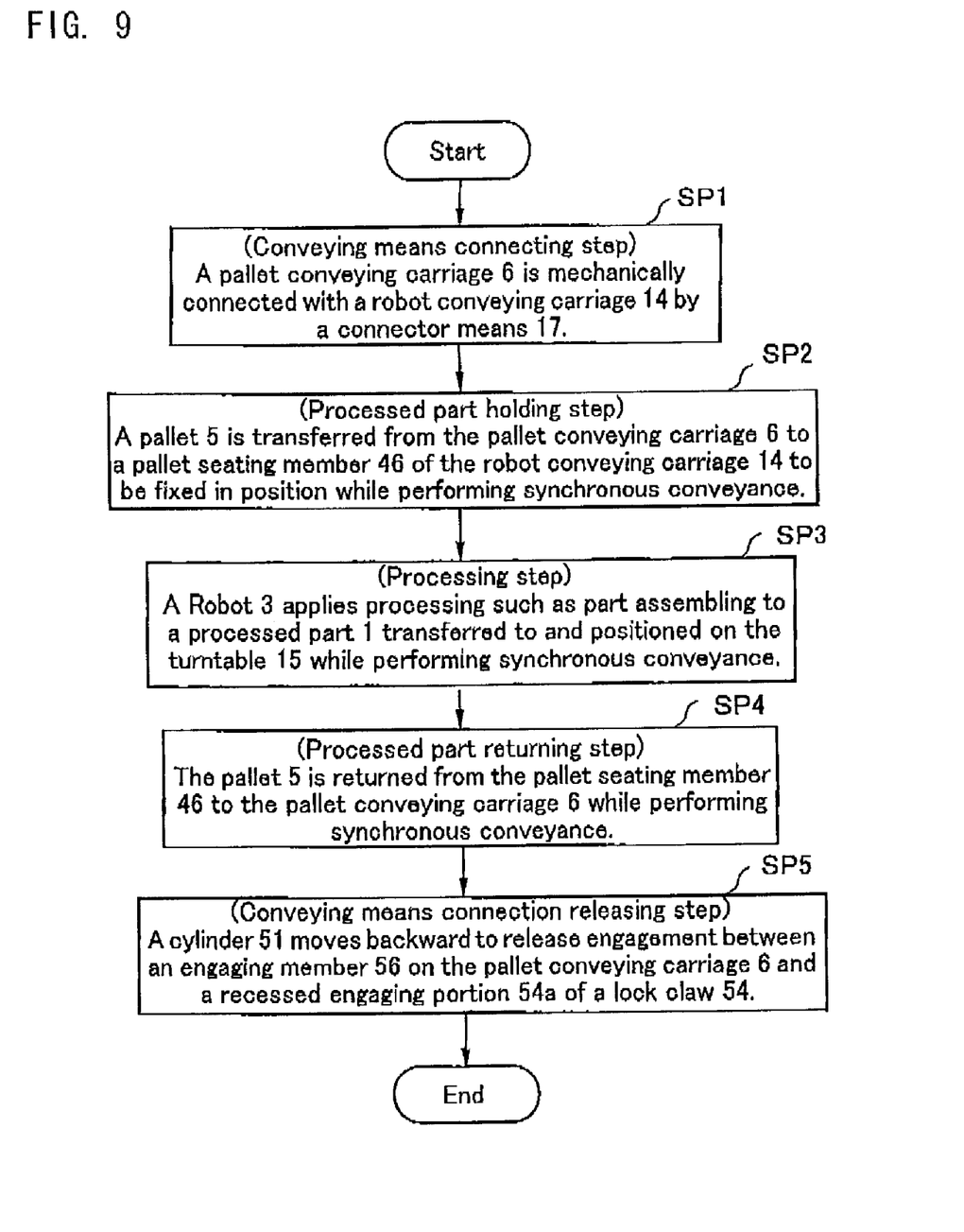
FIG. 9 is a flow chart showing an operation of the assembling production apparatus of the present invention and a process of an assembling production method of the present invention.

Embodiments of the present invention will be explained hereunder with reference to accompanying drawings. Herein, FIG. 1 is a schematic plan view of an assembling production apparatus according to the present invention, FIG. 2 is a schematic side view thereof, FIG. 3 is a plan view of a pallet support means, FIG. 4 is a front view thereof, FIG. 5 is a plan view of a connector means, FIG. 6 is a side view thereof, FIG. 7 is a plan view of a floating mechanism and centering mechanism of a motor, FIG. 8 is a side view thereof, and FIG. 9 is a flow chart showing an operation of the assembling production apparatus of the present invention and a process of an assembling production method of the present invention.

Figure 1:
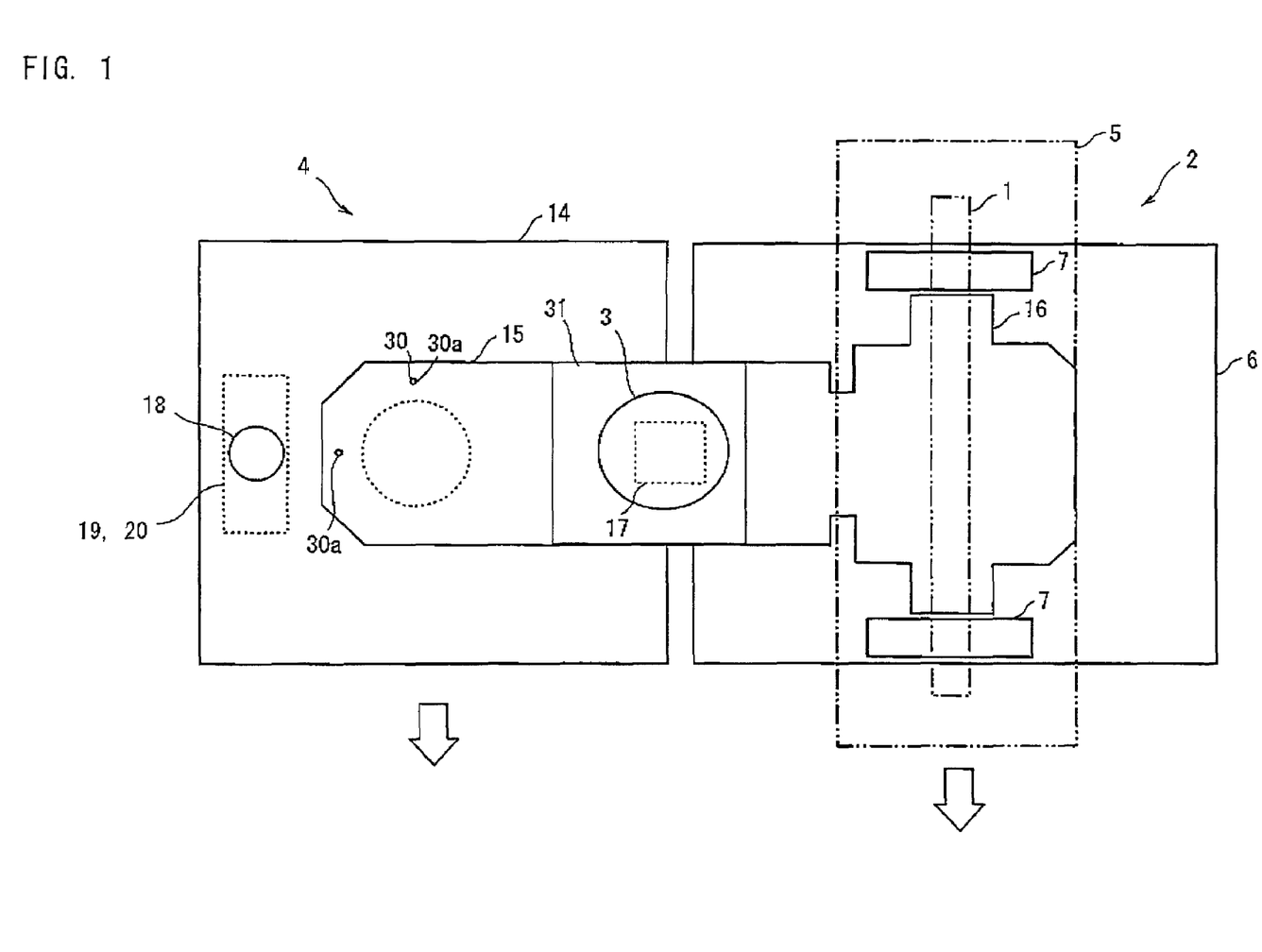
FIG. 1 is a schematic plan view of an assembling production apparatus according to the present invention.
Figure 2:
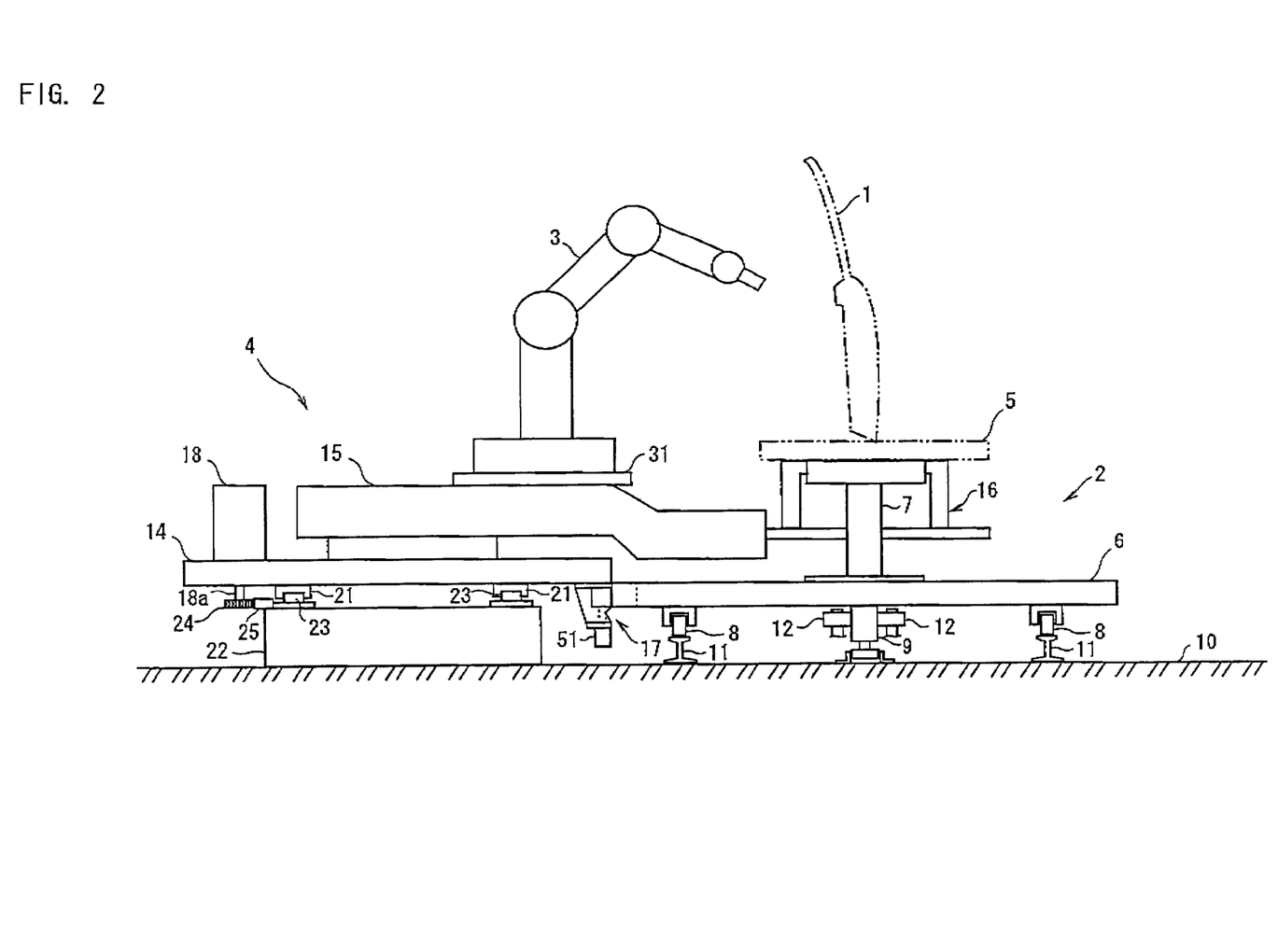
FIG. 2 is a schematic side view of the assembling production apparatus according to the present invention.

As shown in FIG. 1 and FIG. 2, the assembling production apparatus of the present invention comprises a processed part conveying means 2 for having a processed part 1 mounted thereon to free-flow convey the same, and a robot conveying means processing device conveying means) 4 for having mounted thereon a robot 3 which applies processing such as part assembling or the like to the processed part 1, so as to travel in the same direction as the processed part conveying means. Then, in this embodiments the processed part 1 is a door. Also, arrows shown in FIG. 1 show the conveying direction of a pallet conveying carriage 6 and a robot conveying carriage 14.

The processed part conveying means 2 has a pallet 5 which supports the processed part 1, removably mounted on a pair of pallet bearing members 7 uprightly extending on front and rear sides of the pallet conveying carriage 6. In the drawing, the processed part (door) 1 and the pallet 5 are shown in a phantom line. The pallet conveying carriage 6 has a plurality of rollers 8 provided on the lower side thereof and on right and left ends with respect to the direction of conveyance thereof. A guide rail 9 is fixedly provided along the lower center portion and in the direction of conveyance of the pallet conveying carriage. The processed part conveying means 2 free-flow carries the processed part 1 supported on the pallet 5 in such a state that the rollers 8 roll on rails 11 laid on a floor 10 in the direction of conveyance and the guide rail 9 moves while being held on both sides thereof by free-flow conveying rollers 12 arranged in the direction of conveyance.

The robot conveying means 4 comprises a robot conveying carriage 14, a turntable 15 arranged on the robot conveying carriage 14 and mounting the robot 3 thereon to rotationally perform positioning of the robot, a pallet support means 16 provided on the turntable 15 to remove the pallet 5 from the processed part conveying means 2 so as to support the same, and a connector means 17 for synchronously conveying the processed part conveying means 2 in a mechanically connected state. A motor 18 serves as a driving source of the robot conveying means 4. The motor 18 is provided with a floating mechanism 19 and a centering mechanism 20 in relation to the direction of conveyance.

The robot conveying carriage 14 has a plurality of guide members 21 arranged on the lower wall thereof and on right and left ends in the direction of conveyance. These guide members 21 are slidably engaged with rails 23 laid on both ends of a base 22. Further, the motor 18 which projects a rotational spindle 18a from the lower wall thereof is uprightly fixed on the robot conveying carriage 14 through the intermediary of the floating mechanism 19 and the centering mechanism 20, The rotational spindle 18a of the motor 18 has a pinion gear 24 mounted on the tip end thereof. The pinion gear 24 is in engagement with a rack 25 provided on the side wall of the base 22 in the direction of conveyance.

The turntable 15 is rotatably placed on the robot conveying carriage 14 so as to be fixed in a predetermined rotational position. The fixation in the predetermined position of the turntable 15 by being turned from the original position thereof is performed by pulling and inserting a lock pin 30 out of and into a fixing hole 30a. Further, on the turntable 15 there is provided a robot mounting stand 31 for mounting the robot 3 thereon. As shown in FIG. 3 and FIG. 4, the pallet support means 16 comprises a cylinder 35 fixed on the turntable 15, a pallet support body 36 mounted on a rod 35a of the cylinder 35 so as to removably support the pallet 5, a pair of rails 37 laid on the lower wall of the pallet support body 36 so as to extend parallel to the rod 35a, and a plurality of guide members 38 slidably engaged with each of the rails 37. The guide members 38 are fixed on the turntable 15. The forward movement of the cylinder 35 allows the pallet 38 to be supported by the pallet support body 36 while the backward movement thereof allows the pallet support body 36 to move away from the processed part conveying means 2.

The pallet support body 36 comprises a lifting table 40, a pair of clamp claws 41 mounted on the lifting table 40 to clamp and fix lower portions 5a of the pallet 5, two kinds of cylinders 42, 43 mounted on the lifting table 40 so as to operate each of the clamp claws 41, a pair of cylinders 44 having the lifting table 40 moved upward and downward, a base plate 45 fixedly mounting the cylinders 44 and having the pair of rails 37 extended on the lower wall thereof, and pallet seating members 46 fixedly mounted on the lifting table so as to receive the pallet 5 on the lower side. A reference numeral 47 denotes a table for mounting the clamp claw 41.

The cylinder 42 mounted on the lifting table 40 is the one for having the clamp claw 41 moved forward to and backward from the lower portion 5a of the pallet 5 by sliding the table 47 on which the clamp claw 41 is mounted. The cylinder 43 mounted on the table 47 is the one for pressing the clamp claw 41 against the lower portion 5a of the pallet 5 and releasing the same from the lower portion 5a of the pallet 5. Then, the object that the pair of clamp claws 41 clamps is a plate member 5b provided on the lower portion 5a of the pallet 5. The plate member 5b is fixedly secured to the back wall of the pallet 5. The pair of clamp claws 41 enters a cutout formed on the center portion of the plate member 5b so as to clamp the edge of the cutout.

The sliding movement of the clamp claw 41 by the cylinder 42 is smoothly performed by a slide guide 48a fixedly provided on the table 47 and a slide rail 48b fixedly provided on the lifting table 40. Further, the upward and downward movement of the lifting table 40 by the cylinder 44 is smoothly performed by a slide rail 49a fixedly provided on the lifting table 40 and a slide guide 49b fixedly provided on the base plate 45. Herein, when the rod 35a of the cylinder 35 is in an advanced state, the pallet support body 36 and the pallet bearing members 7 uprightly provided on the front and rear of the pallet conveying carriage 6 are constructed not to interfere with each other.

The connector means 17, as shown in FIG. 5 and FIG. 7, is provided to connect the pallet conveying carriage 6 of the processed part conveying means 2 with the robot conveying carriage 14 of the robot conveying means 4 and comprises a cylinder 51 provided through an attachment member 50 on the edge of the robot conveying carriage 14, a lock claw 54 mounted rotatably around a pivot 53 on a lock claw mounting member 52 which is attached to a rod 51a of the cylinder 51, a spring 55 arranged between the lock claw 54 and the lock claw mounting member 52 so as to be contracted in the locking direction of the lock claw 54, and an engaging member 56 provided on the pallet conveying carriage 6 to be engaged with a recessed engaging portion 54a formed on the lock claw 54. A reference numeral 57 denotes a guide member of the cylinder 51.

In the case where the rod 51a of the cylinder 51 is in an advanced state (the state ready for connection) and the robot conveying carriage 14 is in a stopped state or is behind the pallet conveying carriage 6, the engaging member 56, when the pallet conveying carriage 6 aligns with the robot conveying carriage 14, comes into contact with a slant portion 54b of the lock claw 54 and then presses the lock claw 54 downward in opposition to the contracting force of the spring 55, as seen in FIG. 6(a). Next, when the lock claw 54 rotates around the pivot 53 so as to allow the engaging member 56 to come into engagement with the recessed engaging portion 54a, the lock claw 54 returns to the original position under the contracting force of the spring 55. Then, the pallet conveying carriage 6 is connected with the robot conveying carriage 14.

In the case where the connection between the pallet conveying carriage 6 and the robot conveying carriage 14 is released, the rod 51a of the cylinder 51 is moved backward. As seen in FIG. 6(b), when the rod 51a of the cylinder 51a is moved to the backward position, the lock claw 54, the lock claw mounting member 52 mounting the lock claw 54 thereon, etc. move downward to have the engaging member 56 disengaged from the recessed engaging portion 54a, so that the engaging member 56 is released from the locked state. Then, the pallet conveying carriage 6 is free-flow conveyed. Arrows in FIG. 5 and FIG. 6 show the direction of conveyance with respect to the pallet conveying carriage 6 and the robot conveying carriage 14.

As shown in FIG. 7 and FIG. 8, the floating mechanism 19 and the centering mechanism 20 of the motor 18 comprise a plate 60 for fixing the motor 18 thereon, four guide members 61 fixedly provided on four corners of the upper wall of the plate 60, four rails 62 laid on the lower wall of the robot conveying carriage 14 to be slidably engaged with the guide members 61, and a couple of cylinders 63, 64 in series connected with each other by connecting each end opposed to the rods 63a, 64a.

Further, the rod 63a of the cylinder 63 is connected through a bracket 65 with the robot conveying carriage 14 while the rod 64a of the cylinder 64 is connected through a bracket 66 with the plate 60 on which the motor 18 is fixed. Moreover, the rod 63a of the cylinder 63 is in a forwardly moved position in its normal condition while the rod 64a of the cylinder 64 is in a backwardly moved position in its normal condition, Air under predetermined pressure is supplied to the cylinders 63, 64.

Furthermore, on the robot conveying means 4 there is provided a lock mechanism 65 for locking the floating mechanism 19 and the centering mechanism 20 at the time of high speed traveling.

The lock mechanism 65 comprises a rotational roller 67 provided on a rod 66a of a cylinder 66 which is fixedly attached to the robot conveying carriage 14, and a cam member 69 mounted on the end of the plate 60 through a bracket 68. When the roller 67 comes into engagement with the cam member 69 in the advanced position of the rod 66a of the cylinder 66, the floating mechanism 19 and the centering mechanism 20 are brought to the non-functional locked state. Herein, arrows in FIG. 7 and FIG. 8 show the conveying direction of the robot conveying carriage 14.

Next, the operation of the assembling production apparatus of the present invention and an assembling production method of the present invention will be explained hereunder with reference to a flow chart shown in FIG. 9.

Firstly, in step SP1 (conveying means connection step), when the robot conveying carriage 14 stands by in an original position, the pallet conveying carriage 6 mounting thereon the pallet 5 which supports the processed part 1 is free-flow conveyed so as to have the pallet conveying carriage 6 mechanically connected with the robot conveying carriage 14 by the connector means 17.

Next, in step SP2 (processed part holding step), when the pallet conveying carriage 6 is connected with the robot conveying carriage 14, the robot conveying carriage 14 and the pallet conveying carriage 6 start to be synchronously conveyed by rotation of the pinion gear 24 engaged with the rack 25, through driving operation of the motor 18. At the same time that the synchronous conveyance starts, the rod 35a of the cylinder 35 of the pallet support means 16 goes forward to position the pallet support body 36 mounted on the rod 35a under the pallet 5 which is placed on the pallet bearing members 7 of the pallet conveying carriage 6.

Then, the pair of cylinders 44 advances to move the pallet seating members 46 upward so that the pallet seating members 46 lift the pallet 5 up thereby to mount the pallet 5 on the pallet seating members 46. After that, the pair of clamp claws 41 clamps the plate member 5b provided on the lower portion 5b of the pallet 5 by the operation of the cylinders 42, 43.

Next, in step SP3 (processing step), the robot 3 applies processing such as part assembling or the like to the processed part 1 supported on the positioned pallet 5 while synchronously conveying the robot conveying carriage 14 and the pallet conveying carriage 6. At this time, since the robot 3 and the pallet 5 are positioned and fixed with reference to the same turntable 15, the relative positional relationship between the robot and the processed part 1 is fixed thereby to maintain the predetermined processing accuracy Then, in step SP4 (processed part returning step), when the processing to the processed part 1 is completely applied by the robot 3, the clamp of the plate member 5 by the pair of clamp claws 41 is released by the operation of the cylinders 42, 43 and, at the same time, the pair of cylinders 44 is backed to move the pallet seating member 46 downward so that the pallet 5 is placed on the pallet bearing members 7 instead of the pallet seating members 46.

Next, in step SP5 (conveying means connection releasing step), when the returning operation of the pallet 5 to the pallet conveying carriage 6 is completed, the rod 51a of the cylinder 51 of the connector means 17 moves backward to disengage the engagement between the engaging member 56 provided on the pallet conveying carriage 6 and the recessed engaging portion 54a of the lock claw 54. Then, the pallet conveying carriage 6 is conveyed to the next stage by the free-flow conveying roller 12. The robot conveying carriage 14 is returned to the original position by the operation of the motor 18 so that the processing (one cycle) to the processed part 1 is completed. The robot 3 stands by in the original position until the following pallet carriage 6 is conveyed.

On the other hand, on the motor 18 there are provided the floating mechanism 19 and the centering mechanism 20 in relation to the conveying direction. Therefore, the motor 18, the pinion gear 24, the rack 25 and peripheral parts can be prevented from suffering damages even if the load is imposed thereon, in the case where an electric power source for the motor 18 is suddenly turned off during operation and inertial conveying force is caused on the robot conveying carriage 14 and the pallet conveying carriage 6.

INDUSTRIAL APPLICABILITY

According to the present invention, the processed part is transferred from the processed part conveying means to the processing device conveying means and held in position to fix the relative positional relationship between the processing device and the processed part, so that it is possible to provide the method of assembling production and the apparatus therefor that accuracy of the assembling processing by the processing device is improved.

The invention claimed is:

1. A production method of applying processing to a processed part which is free-flow conveyed by a processed part conveying means, by a processing device which is conveyed in the same direction as the processed part by a processing device conveying means having its own driving source, comprising the steps of:
   a conveying means connecting step for connecting said processed part conveying means with said processing device conveying means;
   a processed part holding step for transferring said processed part from said processed part conveying means to said processing device conveying means while synchronous conveyance is performed, so as to position and hold said processed part on said processing device conveying means;
   a processing step in which said processing device applies processing to said processed part while synchronous conveyance is performed;
   a processed part returning step for transferring and returning said processed part from said processing device conveying means to said processed part conveying means while synchronous conveyance is performed; and
   a conveying means connection releasing step for releasing the connection between said processed part conveying means and said processing device conveying means.

2. A production apparatus for applying processing to a processed part which is free-flow conveyed by a processed part conveying means, by a processing device which is conveyed in the same direction as the processed part by a processing device conveying means having its own driving source, wherein said processed part conveying means is provided with a removable pallet for supporting said processed part, and said processing device conveying means comprises a turntable having said processing device mounted thereon to rotationally perform positioning thereof, a pallet supporting means provided on said turntable and removing said pallet from said processed part conveying means to support the same, and a connector means being connected with said processed part conveying means to synchronously convey the same.

3. The production apparatus according to claim 2, wherein a floating mechanism and a centering mechanism in relation to the conveying direction are provided on the driving source of said processing device conveying means.

* * * * *